(12) United States Patent
Sessions et al.

(10) Patent No.: US 12,401,206 B2
(45) Date of Patent: Aug. 26, 2025

(54) BATTERY BALANCING SYSTEM

(71) Applicant: Liftwave, Inc., Somerville, MA (US)

(72) Inventors: Blake Sessions, Boston, MA (US); Boris Gladstein, Swampscott, MA (US)

(73) Assignee: Liftwave, Inc., Somerville, MA (US)

( * ) Notice: Subject to any disclaimer, the term of this patent is extended or adjusted under 35 U.S.C. 154(b) by 702 days.

(21) Appl. No.: 17/725,650

(22) Filed: Apr. 21, 2022

(65) Prior Publication Data

US 2023/0344247 A1    Oct. 26, 2023

(51) Int. Cl.
*H02J 7/00* (2006.01)
*B60L 58/22* (2019.01)

(52) U.S. Cl.
CPC ............ *H02J 7/0019* (2013.01); *B60L 58/22* (2019.02); *H02J 7/0048* (2020.01); *H02J 7/007182* (2020.01)

(58) Field of Classification Search
CPC ...... H02J 7/0014; H02J 7/0016; H02J 7/0018; H02J 7/0019; B60L 11/1866; B60L 58/22; H01M 2010/4271
USPC ......................................................... 320/134
See application file for complete search history.

(56) References Cited

U.S. PATENT DOCUMENTS

| | | | |
|---|---|---|---|
| 5,666,041 A | 9/1997 | Stuart et al. | |
| 5,998,969 A | 12/1999 | Tsuji et al. | |
| 8,217,625 B2 | 7/2012 | Chang et al. | |
| 8,860,371 B2 | 10/2014 | Yang | |
| 10,187,934 B2 | 1/2019 | Melanson et al. | |
| 10,910,858 B2 | 2/2021 | Taylor et al. | |
| 11,894,702 B2 * | 2/2024 | Kuranuki | H01M 10/44 |
| 2004/0135535 A1 * | 7/2004 | Kunzel | F16F 15/005 318/611 |
| 2004/0135545 A1 * | 7/2004 | Fowler | H01M 10/441 320/118 |
| 2010/0295510 A1 | 11/2010 | Moussaoui et al. | |
| 2013/0057198 A1 | 3/2013 | Gerlovin | |
| 2022/0314809 A1 * | 10/2022 | Yokoo | B60L 58/18 |

* cited by examiner

*Primary Examiner* — Julian D Huffman
*Assistant Examiner* — Lisa Kotowski
(74) *Attorney, Agent, or Firm* — Fish & Richardson P.C.

(57) ABSTRACT

This disclosure describes a battery management system that can balance a string of battery cells rapidly, at high power, and without the use of a large auxiliary battery or excessive switches/transistors. A single switched tap is provided at each intermediate node of the battery string, allowing charging and discharging of subsets of the battery string (e.g., cell 1, cells 1 and 2, cells 1-3, etc.). A common charge/discharge (CCD) node can be connected to any one of the intermediate nodes, resulting in a parallel connection with the battery string for each cell at or below the connected intermediate node in the string. A sink is provided which can be used to discharge groups of cells using the connected intermediate node. Additionally, a source can be provided, such as a buck-boost chopper acting as a current supply, to charge the group of cells using the connected intermediate node.

17 Claims, 3 Drawing Sheets

BATTERY BALANCING SYSTEM

TECHNICAL FIELD

This disclosure generally relates to a battery management system and a method for balancing a string of batteries.

BACKGROUND

Battery cells are often arranged in a series connection to establish a desired voltage and current capability. These series arrangements of battery cells, often called battery strings, can include a number of nearly identical cells. Minor differences in manufacture or chemistry of the battery cells, among other things, can result in cells that have varying capacities across the string. When charging a string of batteries, the cell with least capacity will reach a full state of charge prior to the remaining cells, reducing the overall capacity of the string because continued charging will cause cell damage to the cell with the least capacity. To overcome this, battery strings can be balanced, allowing greater utilization of all cells in the string, despite differences in individual capacity from cell to cell.

SUMMARY

In general, the disclosure involves a method, system, and circuit for balancing a string of batteries. The method includes connecting a common charge/discharge (CCD) node in parallel with a first cell group including one or more cells of a plurality of cells in the string of batteries. A first state of charge associated with the first cell group is determined, and the CCD node is disconnected from the first cell group and connected in parallel with a second cell group, the second cell group including the first cell group and one or more additional cells of the plurality of cells. A second state of charge associated one or more additional cells is determined, and in response to the second state of charge being lower than the first state of charge: the CCD node is disconnected from the second cell group and connected in parallel with the first cell group and a power sink is connected to the CCD node. The first cell group is discharged into the power sink until the first state of charge the second state of charge of the one or more additional cells. In response to determining that the second state of charge is higher than the first state of charge: the CCD node is disconnected from the second cell group, and connected in parallel with the first cell group and a power source is connected to the CCD node to charge the first cell group using the power source until the first state of charge matches the second state of charge. The process is repeated for a third cell group, where the CCD node is connected in parallel with a third cell group, the third cell group including the second cell group and one or more new additional cells of the plurality of cells. A third state of charge is determined, the third state of charge associated with the one or more new additional cells of the plurality of cells and compared with the second state of charge. In response to the third state of charge being lower than the second state of charge: the CCD node is connected in parallel with the second cell group and the power sink is connected to the CCD node. The second cell group is discharged into the power sink until the second state of charge matches the third state of charge. In response to determining that the third state of charge is higher than the second state of charge the CCD node is connected in parallel with the second cell group and a power source is connected to the CCD node. The second cell group is charged with the power source until the second state of charge matches the third state of charge.

Implementations can optionally include one or more of the following features.

In some implementations, the CCD node is connected to additional cell groups, each additional cell group including a previously balanced cell group, until each cell of the plurality of cells has been balanced.

In some implementations, the first state of charge, the second state of charge, and the third state of charge are determined by measuring a voltage from the connected CCD node to ground and dividing by a number of connected cells.

In some implementations, the first state of charge matches the second state of charge when the first state of charge is within two percent of the second state of charge.

In some implementations, the power sink is an electric machine. In some implementations, the electric machine is driven using field-oriented control (FOC) and a direct force in the FOC and a quadrature force in the FOC are select to prevent rotation of the electric machine.

In some implementations the power source is a buck-boost type, direct current to direct current converter.

The disclosed system and circuit includes a string of battery cells connected in series. Two or more intermediate nodes, each intermediate node connecting two cells of the string of battery cells, and each intermediate node including a single switched connection. The system further includes, a common charge/discharge (CCD) node connected to each particular intermediate node by the switched connection of that intermediate node. The system also includes a power source configured to supply power to the CCD node and a power sink connected via a discharge switch to the CCD node, the power sink configured to dissipate power discharged from a particular intermediate node or the battery string when the discharge switch is closed.

The system and circuit can optionally include one or more of the following features.

In some instances, the CCD node includes a voltage sensor connected between the CCD node and ground.

In some instances, the CCD node includes a bi-directional current sensor connected between the switched connections of the intermediate nodes, and both the power source and the power sink.

In some instances, the power source is a buck-boost type, direct current to direct current converter.

In some instances, the power sink is an electric machine. Optionally, the electric machine is driven using field-oriented control (FOC), and the electric machine is configured to dissipate power by selecting a direct force in the FOC and a quadrature force in the FOC that prevent rotation of the electric machine.

In some instances, each switched connection includes a field effect transistor.

Some conventional battery balancing methods, known as passive balancing, discharge cells across shunt resistors. Because the cells with a higher state of charge will be at a higher voltage, they will shunt relatively more power than cells at a lower state of charge. This results in automatic balancing of the cells during charge operations, however is generally an inefficient process, and is limited in the amount of power that can be discharged, or the difference in cell state of charge that can be effectively balanced. In some implementations of passive balancing, the shunt resistor is switched, to prevent undesired discharge when the batteries are in balance. Alternatively, active balancing often uses an auxiliary power storage device, such as a battery or capacitor to remove power from cells of a high state of charge, and charge cells with a low state of charge. Active balancing requires complex switching mechanisms and an auxiliary power storage device, which adds weight and complexity to a battery management system.

This disclosure describes a battery management system that can balance a string of battery cells rapidly, at high power, and without the use of a large auxiliary battery, excessive switches/transistors, or gate driver components that are not ground referenced. A single switched tap is provided at each intermediate node of the battery string, allowing charging and discharging of subsets of the battery string (e.g., cell 1, cells 1 and 2, cells 1-3, etc.). A common charge/discharge (CCD) node can be connected to any one of the intermediate nodes, resulting in a an access point to a series connection within the battery string for each cell at or below the connected intermediate node in the string. A sink is provided which can be used to discharge groups of cells using the connected intermediate node. Additionally, a source can be provided, such as a buck-boost chopper acting as a current supply, to charge the group of cells using the connected intermediate node. This configuration can provide the ability to perform battery balancing for the entire string of batteries, without a need for an auxiliary power storage device, and using a minimum number of sensors and switches (e.g., transistors), resulting in a cost effective, lightweight, and easily automated battery management system.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

This disclosure describes a battery management system and method of battery balancing that permits high power or high power differential balancing, with limited additional components and complexity.

To help a person skilled in the art better understand the technical solutions in the present specification, the following clearly and comprehensively describes the technical solutions in the implementations of the present specification with reference to the accompanying drawings in the implementations of the present specification. The described implementations are merely some rather than all of the implementations of the present specification. All other implementations obtained by a person of ordinary skill in the art based on one or more implementations of the present specification without creative efforts shall fall within the protection scope of the implementations of the present specification.

Figure 1:
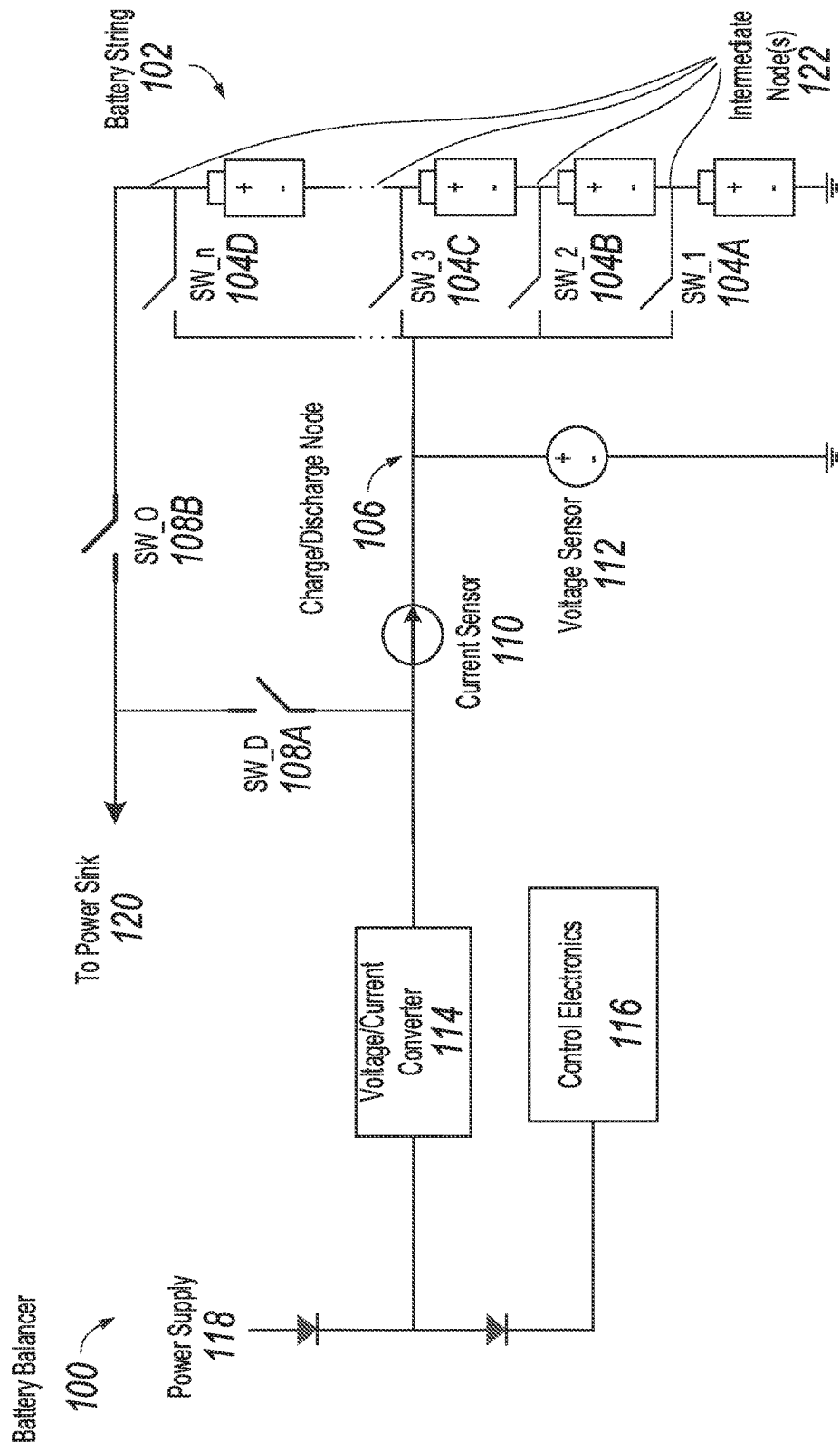
FIG. 1 depicts an example battery balancing system.

FIG. 1 depicts an example battery balancing system 100. The battery balancing system 100 can be used for any implementation where a string of batteries is charged and discharged and requires balancing, where a power sink such as an electric machine is available. The battery balancing system 100 includes a battery string 102, which has a plurality of cells connected in series. The battery string 102 can be of any length (e.g., 4 cells, 10 cells, 1000 cells, etc.). An output of the battery string 102 is connected to the positive terminal of the highest cell in the string, while the negative terminal of the lowest cell in the string can be connected to ground (or another reference such as bus negative, chassis ground, etc.). A common charge/discharge node (CCD) 106 is connected to the battery string at each intermediate node 122 of the string through switches 104A-104D. Switches 104A-D can be mechanical switches, electric switches (e.g., MOSFETS, SCR's, etc.) or other devices for making and breaking electrical connections between the CCD node 106 and the battery string 102. A power supply 118 provides power to the CCD node 106 through a voltage/current converter 114. Discharge switch 108A and operation switch 108B are used to connect the battery string 102 to a power sink 120, which can discharge the entire battery string 102, or portions thereof.

Switches 104A-D which provide a connection to the various intermediate nodes 122 of the battery string 102 can be interlocked. In other words, a mechanical, or electronic system can prevent more than one switch from shutting at a time, to ensure that no cell or group of cells is short circuited. For example, a microprocessor in control electronics 116 can perform a verification that none of switches 104A-104D are shut prior to sending a command signal to switch 104B in order to connect the first two cells of the battery string 102 in parallel with the CCD node 106. In another example, if voltage/current converter 114 is in an off state, and voltage sensor 112 detects a voltage on the CCD node 106 that is greater than a predetermined threshold, then switches 104A-D can be prevented from shutting. One or more discharge switches 108A and operation switches 108B are also provided. During normal operation the operation switches 108B will be closed, allowing the battery to discharge, performing their intended function. Switch 108A provides a discharge path from the CCD node 106, and enables discharging of portions of the battery string 102 based on where the CCD node 106 is connected. In some implementations, a mechanical or electrical interlock exists between the discharge switch(s) 108A and the operation switch(s) 108B to prevent both switches being shut simultaneously, and potentially short circuiting a portion of the battery string 102.

The voltage/current converter 114 can be any suitable device for converting power from power supply 118 to a suitable voltage for charging operations of the applicable portion of battery string 102. As described in greater detail below with respect to FIG. 2, the voltage/current converter 114 can deliver a desired output voltage and current in order to reliably deliver power to a particular intermediate node 122 to be charged. For example, if three cells are connected (e.g., SW_3 104C is shut) and each cell is a 3.3V cell, then voltage/current converter 114 can supply 9.9 volts, if it is intended to deliver zero current to that portion of the battery string 102. In some implementations, voltage/current converter 114 can supply a desired current at a specified voltage, such as a voltage selected to maintain a target level of electrical current flow. For example, voltage/current converter 114 can supply 5 Amps of current in order to charge cells one through three of battery string 102. In some implementations where the power supply 118 is a DC power supply, the voltage/current converter 114 is a DC-DC converter such as a buck-boost chopper. In some implementations, voltage/current converter 114 is a circuit constructed around Analog Device's LTC3779 4-switch Buck-Boost Controller, or similar device. Voltage/current converter 114 can have an off, or de-energized state, in which it acts as an open circuit, preventing current flow into or out of the CCD node 106 from the power supply 118.

The voltage sensor 112 can be a standard voltmeter, which can measure voltage between the CCD node 106 and reference (e.g., ground). One advantage of the battery balancer 100 is that only a single voltage sensor 112 is required, permitting the use of high accuracy circuitry within a given budgetary constraint. Individual cell voltage can be determined based on sequentially measuring voltage at the intermediate nodes 122 of the battery string 102. For example, the voltage of the bottom cell of the string in example balancer 100 can be directly measured by closing SW_1 104A. The voltage of the second cell can be measured by closing SW_2 104B and subtracting the voltage of the bottom cell from the voltage sensed by voltage sensor 112. The voltage of the third cell can be measured by closing SW_3 104C and subtracting the voltage of the bottom two cells from the voltage sensed by voltage sensor 112. The voltage of the top cell can be measured by closing SW_n 104D and subtracting the voltage of each of the lower cells from the voltage sensed by voltage sensor 112. In this manner, a voltage for each cell, or groups of cells can be determined by a single voltage sensor 112. This reduces the total cost of the battery balancer 100 by minimizing the number of sensors required. Additionally, a more precise voltage sensor can be selected, where only one is needed instead of a separate voltage sensor for each cell in the battery string 102. In some implementations, during voltage sensing operations, the voltage/current converter 114 is in an off state and discharge and operation switches 108A-B are open for a specified period of time prior to measurement in order to allow battery charge levels to reach steady state and to prevent inaccurate measurements or errant voltages. During charging operations, when the voltage/current converter 114 is active, the voltage sensor 112 can be used to measure output voltage of the voltage/current converter, and provide an estimated rate of charge for the portion of the battery string 102 being charged.

The power sink 120 can be any suitable device for dissipating discharged power from the battery string 102. When either the discharge switch 108A or the operation switch 108B is shut, the battery string 102, or connected portion thereof, will discharge into the power sink 120. In some implementations, the power sink 120 is a large power resistor, capable of high currents and connected to ground. In these implementations, the power sink 120 is configured to dissipate discharged power from the battery string 102 as heat. In some implementations, the power sink 120 is an electric machine (e.g., an electric motor) which converts electrical energy into mechanical energy or electrical energy into mechanical energy. In some implementations, an additional switch (not illustrated) is provided to enable control electronics 116 to select where the discharged power from the battery string 102 is dissipated (e.g., to a motor or to a resistor). This disclosure is not limited to these examples.

For instance, the power sink 120 can be a light, computer system, other electrical network, energy storage medium (e.g., additional battery or battery string, capacitor, etc.), or any other suitable device that can receive electrical power from the battery string 102 or a portion thereof. During balancing operations, the power sink 120 will receive a portion of the total battery string voltage, based on which intermediate node 122 is connected. For example, if the lower two cells of the battery string 102 are at a higher state of charge than the remaining cells, SW_2 104B can be shut, and the discharge switch, SW_D 108A, energy will flow from the bottom to cells to the power sink 120. If for example each cell provides a nominal 3.3V, then the power sink 120 will receive approximately 6.6V. If the entire battery string 102 is being discharged (e.g., during operation using SW_O 108B) than the power sink 120 will receive the entire voltage of the battery string 102.

A current sensor 110 is provided on the CCD node 106, which measures current entering or exiting the CCD node 106 from the voltage/current converter 114 or through the discharge switch 108A. The current sensor 110 can be a bi-directional current sensor (i.e., a sensor that can detect current flowing into the CCD node 106 as well as current flowing out of the CCD node 106). In some implementations, the current sensor 110 is used to estimate a rate of charge for portions of the battery string 102, as well as to provide feedback and control to the voltage/current converter 114. In some implementations, a Texas Instruments TMCS 1108 sensor is used, but other suitable current sensors are contemplated within the scope of this disclosure.

The control electronics 116 can provide control and coordination for the battery balancing system 100 and additional systems, as described below with reference to FIG. 2. The control electronics 116 can provide gating signals, or open/shut commands to the various switches in battery balancer 100 (e.g., Switches 104A-D, switches in the voltage/current converter 114, and switches 108A-B) as well as commands outside of the battery balancer 100 (e.g., to power supply 118 or power sink 120). Additionally, the control electronics 116 can include one or more microcontrollers or microprocessors, and be capable of performing calculations associated with battery operations. For example, the control electronics 116 can read sensed voltage from the voltage sensor 112, and switch positions, and calculate the state of charge for a particular cell or group of cells. In another example, the control electronics 116 can determine a switching sequence in order to perform balancing operations of the battery balancer 100. While illustrated as powered directly from power supply 118, in some implementations, the control electronics 116 are powered from the battery string 102, or multiple sources.

Figure 2:
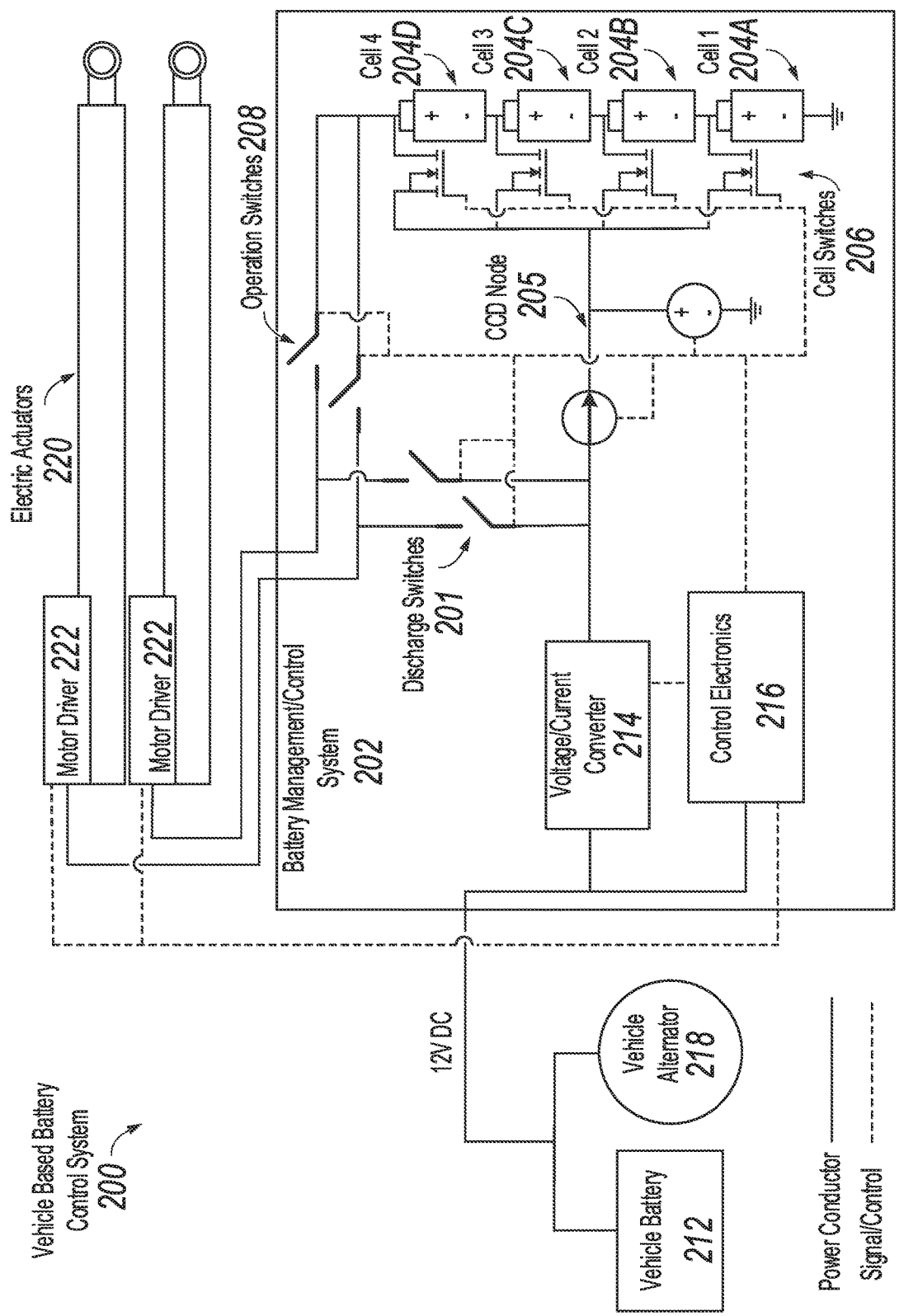
FIG. 2 depicts an example implementation of a battery balancing system in a vehicle.

FIG. 2 depicts an example implementation of a battery balancing system in a vehicle such as a forklift, loading/shipping truck, aircraft, or other vehicle with an electric actuator system installed. This particular example implementation includes a vehicle based battery control system 200 with a battery management/control system 202, two electric actuators 220, a vehicle battery 212, and a vehicle alternator 218. In FIG. 2, the battery string includes four cells, cell 1 though cell 4 (204A-D). Additionally, because two electric actuators 220 are connected, there are two discharge switches 201 and two operation switches 208. It should be noted that there can be more (e.g., 3, or 10, etc.) electric actuators 220, or fewer (e.g., 1) electric actuators 220. Additionally, the present disclosure is not limited to a battery string of four cells.

In the illustrated implementation of a vehicle based battery control system 200, there is a battery string of four 12V cells, for a nominal total string voltage of 48V that will fluctuate between 40V and 56V in operation. The battery management/control system 200 operates two electric actuators 220, which each include a motor driver 222. In this implementation, the electric actuators 220 can be operated similarly to the power sink 120 as described in FIG. 1, absorbing energy from the cells 204 when either in operation or during balancing. During operation, the motor drivers 222 for each actuator 220 can command the electric actuator 220 to move (e.g., contract) based on command signals from controls electronics 216. In some implementations, the motor drivers 222 use field-oriented control (FOC) to drive an electric motor in the electric actuators 220. During operation, a direct force vector, or motor flux current (d) can be driven to zero, and a quadrature force vector, or a torque producing current (q) can be driven to a desired amount of torque, therefore minimizing wasted power and maximizing torque output of the electric motor. During battery balancing operations where movement of the actuator 220 is not desired, the motor driver FOC can instead drive q to zero, and d to some value, thereby expending energy in the coils of the electric motor in electric field generation and coil heating, without generating significant torque in the motor or moving the electric actuator 220. In some implementations, the motor driver 222 is a circuit constructed around Texas Instruments' DRV8350 series of Smart Gate Driver chips.

In the illustrated implementation, two electric actuators 220 are provided, and therefore two operation switches 208 and two discharge switches 201 are connected, one to each electric actuator 220. In some implementations, the discharge switches 201 and the operation switches 208 are electronically interlocked. For example, if either of the two operation switches 208 are shut, then both of the discharge switches 201 can be prevented from shutting. Similarly, if either of the two discharge switches 201 are shut, both of the operation switches 208 can be prevented from shutting, ensuring the battery string or a portion thereof is not short circuited. By allowing discharge through both electric actuators 220 in parallel, the maximum discharge rate during battery balancing operations is increased by using the thermal sinks present in both electric actuators 220.

Control electronics 216 can provide gating signals to the cell switches 206, as well as the discharge switches 201 and the operation switches 208. Additionally, the control electronics 216 can send signals or commands to the motor drivers 222 of the electric actuators 220, or other external systems, such as a vehicle ECU or a display unit (not shown). The control electronics 216 can select which node the CCD node 205 is connected to by sending a gating signal to one of the cell switches 206 in order to shut the cell switch 206. In this implementation, metal-oxide semiconductor field effect transistors (MOSFETs) are used as an electronic "switch" to connect or disconnect the CCD node 205 to different locations in the battery string. NTMTSC002 MOSFETs can, for example, be used for cell switches 206.

Power is supplied to the battery management/control system 202 using the vehicle's nominally twelve volt power system, which includes a vehicle battery 212 and a vehicle alternator 218. The vehicle alternator generates DC power (typically at around 13V) from the rotation of the vehicle engine while it is running. The voltage/current converter 214 is a DC/DC voltage converter which can step up the received voltage, or step down the received voltage. For example, where cell 2 204B and cell 1 204A are connected to the CCD node 205 to be charged, the voltage/current converter 214 will step up the 12V DC from the vehicle supply to 24V DC to charge the bottom two cells of the battery string (204A and 204B). In other configurations, the voltage/current converter 214 can provide 12V DC, 36V DC, or 48V DC, among other voltages to charge all or a portion of the battery string. The controls electronics 216 can send commands such as desired output voltage or on/off commands to the voltage/current converter 214.

The following is one example of how a battery balancing operation may occur. For example, assume that initially cell 1 204A is at a 10% state of charge, cell 2 204B is at a 15% state of charge, cell 3 204C is at an 80% state of charge, and cell 4 204D is at a 20% state of charge. In this scenario, if the battery string were charged in its entirety, cell 3 204C would reach 100% state of charge first, and continued charging would damage cell 3, however, the remaining cells would not be fully charged. Therefore, prior to charging, a balancing operation is performed. The control electronics can sequentially connect the CCD node 205 to each intermediate node of the battery string, and measure voltage to determine a state of charge for each of the cells 204A-D. Once state of charge is known, the battery management/control system 202 can balance the battery cells 204A-D as follows:

The CCD node 205 is connected above cell 1 204A, by shutting the appropriate cell switch 206. The voltage/current converter 214 provides 12V DC charge to raise the state of charge of cell 1 206 A from 10% to 15% in order to match cell 2 204B. The control electronics 216 can consider the state of charge for two given cells or groups of cells "matched" when it is within a predetermined threshold (e.g., less than 5%, or less than 1%, or other suitable threshold). In some implementations, the cells or cell groups are considered "matched" when their state of charge is within 2% of each other.

Once cell 1 204A and cell 2 204B are matched, the CCD node can be connected above cell 2 204B, and cells 1 and 2 (204A and 204B) can simultaneously be charged using the voltage/current converter 214 to 80% state of charge in order to match cell 3 204C. With cells 1-3 matched, the CCD node can then be connected above cell 3 204C, the voltage/current converter 214 can be de-energized or otherwise turned off/opened and the discharge switches 201 can be shut, allowing cells 1-3 to discharge through the motor drivers 222 into the stators of the motors contained within electric actuators 220. During discharge, the controls electronics 216 can command the motor drivers 222 to prevent motion of the electric actuators 220 as described above using FOC, while monitoring discharge current and voltage for cells 1-3 (204A-C). When cells 1-3 reach a 20% state of charge, matching cell 4 204D, the battery string is then ready to be fully charged in a uniform manner.

The foregoing is one example of a battery balancing operation. A person of ordinary skill in the art would recognize that different sequences and combinations of charge/discharge operations are possible during battery balancing to equalize state of charge amongst the cells of the battery string. For example, in some instances, cells can be partially charged or discharged, without fully matching them, prior to performing a full match, thus the previous process can be performed in a piece-wise manner in order to maintain battery cells closer to the center of their range of state of charge.

Figure 3:
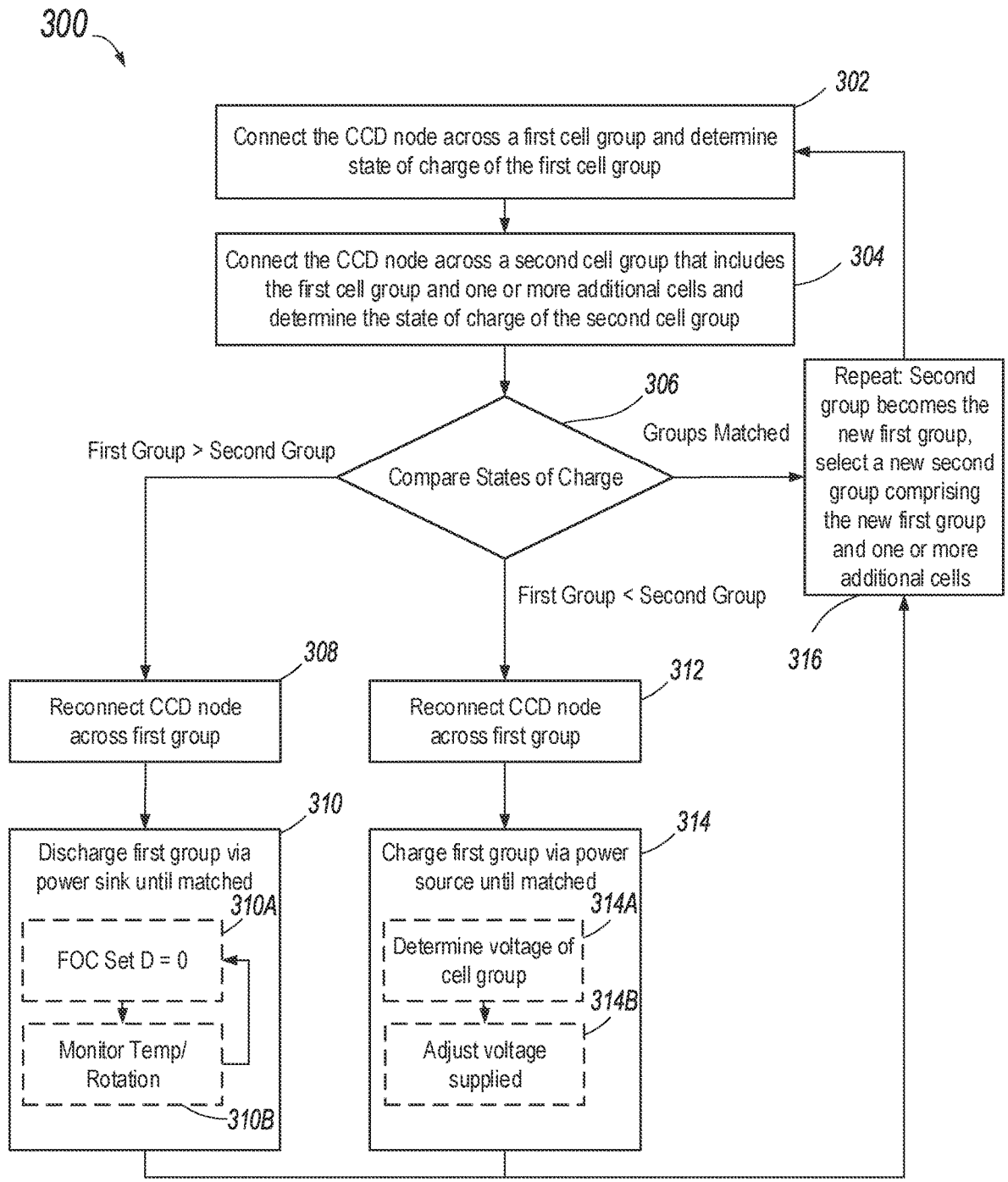
FIG. 3 depicts a flowchart illustrating an example method for balancing series connected batteries.

FIG. 3 depicts a flowchart illustrating an example method for balancing series connected batteries. FIG. 3 generally describes process 300 for using a battery balancing system such as battery balancer 100 as described with reference to FIG. 1, or vehicle based battery control system 200 as described with reference to FIG. 2, to balance charge in a battery string. Process 300 can be executed by, for example, control electronics 216 of FIG. 1.

At 302, a common charge/discharge (CCD) node is connected across a first cell group, and a state of charge of that cell group is determined. The cell group can include one or more battery cells that are connected in series. In some instances, the first cell group is the lowest battery cell in the string during the first iteration, with each iteration of process 300 adding an additional cell (or group of cells) to the first cell group. State of charge for the cell group can be determined based on a measured voltage from the connected CCD node to ground. In some implementations, state of charge can be determined based on additional parameters other than the measured voltage, such as ambient temperature, battery temperature, number of connected battery cells, measured current flow, measured amp-hour consumption, cell specific gravity, recent charge/discharge history (e.g., settling time since last high power event) or other parameters.

At 304, the CCD node is connected across a second cell group, the second cell group including the first cell group as a subset. In some implementations, the second cell group is the first cell group along with the next adjacent cell in the battery string. A state of charge for the second cell group is determined, and can be determined similarly to the method used for determining the state of charge of the first cell group.

At 306, the state of charges of the first cell group and newly added cells of the second cell group are compared. If the first cell group has a higher state of charge than the second cell group, the first cell group will need to be discharged to match the second cell group and process 300 proceeds to 308. If the first cell group has a lower state of charge than the second cell group, the first cell group will be charged to match the newly added cells in the second cell group and process 300 proceeds to 312. If the first cell group and the second cell group have a matched state of charge (e.g., within 1% of each other) than the process 300 can proceed to 316 where the second cell group is redefined as a new first cell group and process 300 restarts at 302 with the new first cell group, and a new second cell group including new additional cells and the new first cell group (i.e., the second cell group) included as a subset of the new second cell group.

Returning to 308, where the first cell group has a higher state of charge than the second cell group, the CCD node is reconnected across the first cell group. At 310, the first cell group is discharged to match the state of charge of the second cell group. Optionally, the first cell group is discharged into motor windings using a motor controller using field-oriented control (FOC), with a desired torque current vector (q) set to zero, or a minimum value, and the desired flux current vector (d) to at a finite value to ensure the motor being controlled does not generate significant torque. During discharge operations, temperature and rotation associated with the motor windings can be measured to ensure no electrical components are damaged (310B). Additionally, battery temperature and other parameters can be monitored. When the first cell group's state of charge is reduced to match that of the new cells in the second cell group, process 300 proceeds to 316.

Returning to 312, where the first cell group is at a lower state of charge than the second cell group, the CCD node is connected across the first cell group.

At 314, the first cell group is charged using an external power source until it has a state of charge that matches the second cell group. Optionally, a voltage of the cell group being charged can be determined (314A) and the supplied charging voltage can be adjusted accordingly (314B). For example, if Cells 1-3 204 (A-C) as described with respect to FIG. 2 are being charged, the nominal voltage for those three series connected cells is 36V. The supplied voltage can be adjusted to ensure an adequate charge rate for the 36V string of cells. Once the first group's state of charge matches the second group's, process 300 proceeds to 316, where the cell groups are redefined and process 300 iterates.

In some implementations, process 300 iterates until each cell in the batter string has been matched, ensuring the entire string is balanced.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method for balancing a string of batteries, the method comprising:
   connecting a common charge/discharge (CCD) node in parallel with a first cell group comprising one or more cells of a plurality of cells in the string of batteries;
   determining a first state of charge associated with the first cell group;
   disconnecting the CCD node from the first cell group and connecting the CCD node in parallel with a second cell group comprising the first cell group and one or more additional cells of the plurality of cells;
   determining a second state of charge associated with the one or more additional cells of the plurality of cells;
   in response to determining that the second state of charge is lower than the first state of charge:
   disconnecting the CCD node from the second cell group and connecting the CCD node in parallel with the first cell group; and
   connecting a power sink to the CCD node and discharging the first cell group into the power sink until the first state of charge matches the second state of charge;
   in response to determining that the second state of charge is higher than the first state of charge:
   disconnecting the CCD node from the second cell group and connecting the CCD node in parallel with the first cell group; and
   connecting a power source to the CCD node and charging the first cell group with the power source until the first state of charge matches the second state of charge;
   disconnecting the CCD node from the first cell group and connecting the CCD node in parallel with a third cell group, the third cell group comprising the second cell group and one or more new additional cells of the plurality of cells;

determining a third state of charge associated one or more new additional cells of the plurality of cells;

in response to determining that the third state of charge is lower than the second state of charge:

disconnecting the CCD node from the third cell group and connecting the CCD node in parallel with the second cell group; and connecting the power sink to the CCD node and discharging the second cell group into the power sink until the second state of charge matches the third state of charge;

in response to determining that the third state of charge is higher than the second state of charge:

disconnecting the CCD node from the third cell group and connecting the CCD node in parallel with the second cell group; and connecting the power source to the CCD node and charging the second cell group with the power source until the second state of charge matches the third state of charge.

2. The method of claim 1, wherein the CCD node is connected to additional cell groups, each additional cell group comprising a previously balanced cell group, until each cell of the plurality of cells has been balanced.

3. The method of claim 1, wherein determining the first state of charge, the second state of charge, and the third state of charge comprises measuring a voltage from the connected CCD node to ground and dividing by a number of connected cells.

4. The method of claim 1, wherein the first state of charge matches the second state of charge when the first state of charge is within two percent of the second state of charge.

5. The method of claim 1, wherein the power sink is an electric motor.

6. The method of claim 5, wherein the electric motor is driven using field-oriented control (FOC), and wherein a direct force in the FOC and a quadrature force in the FOC are selected to prevent rotation of the electric motor.

7. The method of claim 1, wherein the power source is a buck-boost type, direct current to direct current converter.

8. A battery string balancing circuit comprising:
a string of battery cells connected in series;
two or more intermediate nodes, each intermediate node connecting two cells of the string of battery cells, and each intermediate node comprising a single switched connection;
a common charge/discharge (CCD) node connected to each particular intermediate node by the switched connection of that intermediate node;
a power source configured to supply power to the CCD node; and
a power sink connected via a discharge switch to the CCD node, the power sink configured to dissipate power discharged from a particular intermediate node or the battery string when the discharge switch is closed, wherein the power sink is an electric motor, and wherein the electric motor is driven using field-oriented control (FOC), and wherein the electric motor is configured to dissipate power by selecting a direct force in the FOC and a quadrature force in the FOC that prevent rotation of the electric motor.

9. The circuit of claim 8, wherein the CCD node comprises a voltage sensor connected between the CCD node and ground.

10. The circuit of claim 8, wherein the CCD node comprises a bi-directional current sensor connected between the switched connections of the intermediate nodes, and both the power source and the power sink.

11. The circuit of claim 8, wherein the power source is a buck-boost type, direct current to direct current converter.

12. The circuit of claim 8, wherein each switched connection comprises a field effect transistor.

13. A system for balancing batteries, the system comprising:
a string of battery cells connected in series;
two or more intermediate nodes, each intermediate node connecting two cells of the string of battery cells, and each intermediate node comprising a single switched connection;
a common charge/discharge (CCD) node connected to each particular intermediate node by the switched connection of that intermediate node;
a power source configured to supply power to the CCD node; and
a power sink connected via a discharge switch to the CCD node, the power sink configured to dissipate power discharged from a particular intermediate node or the battery string when the discharge switch is closed, wherein the power sink is an electric motor, wherein the electric motor is driven using field-oriented control (FOC), and wherein the electric motor is configured to dissipate power by selecting a direct force in the FOC and a quadrature force in the FOC that prevent rotation of the electric motor.

14. The system of claim 13, wherein the CCD node comprises a voltage sensor connected between the CCD node and ground.

15. The system of claim 13, wherein the CCD node comprises a bi-directional current sensor connected between the switched connections of the intermediate nodes, and both the power source and the power sink.

16. The system of claim 13, wherein the power source is a buck-boost type, direct current to direct current converter.

17. The system of claim 13, wherein each switched connection comprises a field effect transistor.

* * * * *